Oct. 7, 1930.  M. BLENZ  1,777,743
ATTACHMENT FOR COOKING VESSELS
Filed Oct. 12, 1929

INVENTOR
Martin Blenz
BY
George C. Heinrich
ATTORNEY

Patented Oct. 7, 1930

1,777,743

UNITED STATES PATENT OFFICE

MARTIN BLENZ, OF NEW YORK, N. Y.

ATTACHMENT FOR COOKING VESSELS

Application filed October 12, 1929. Serial No. 399,239.

This invention relates to an attachment for cooking or culinary vessels, particularly intended to prevent milk or other similar fluids or semi-fluid foods from boiling over, and is related to the device disclosed in my Patent No. 1,719,042 issued July 2, 1929.

It is the principal object of my invention to provide an attachment which can readily be placed upon or removed from kettles, pots, boilers, or similar vessels, and which is of simple and, therefore, inexpensive construction, yet durable and efficient in operation, and positively prevents the milk or other similar food from boiling over.

Another object of my invention is the provision of an attachment of this character which has its body substantially conically shaped tapering towards its end in order to facilitate the storing and shipping of a great number of such devices.

A further object of my invention is the provision of a device of this character which is equipped with a dish-like perforated foot flange and a substantially conically shaped perforated body integrally made with said foot flange allowing a returning of the rising milk or other similar substance into the pot or cooking vessel.

A still further object of my invention is the provision of an attachment for cooking vessels or the like in which the perforations in the foot flange on the inner face thereof will break the skin forming at the top of the rising body of milk during the boiling thereof.

These and other objects and advantages of my invention will become more fully known as the description thereof proceeds, and will then be specifically defined in the appended claims.

In the accompanying drawing, forming a material part of this disclosure:

Figure 1:
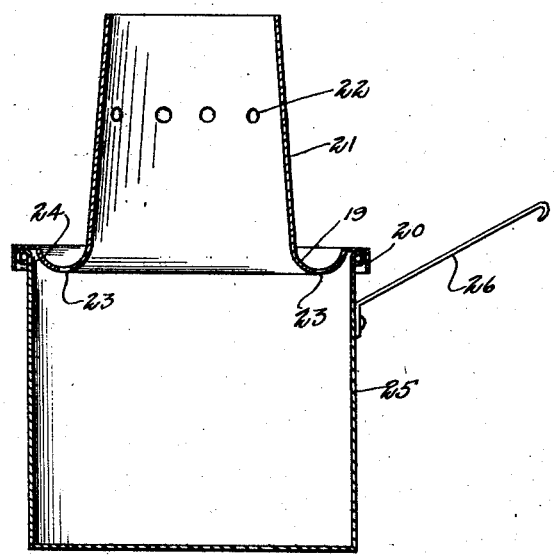
Fig. 1 is a sectional side elevation of the attachment constructed according to my invention in position on a cooking vessel also shown in sectional side elevation.
Figure 2:
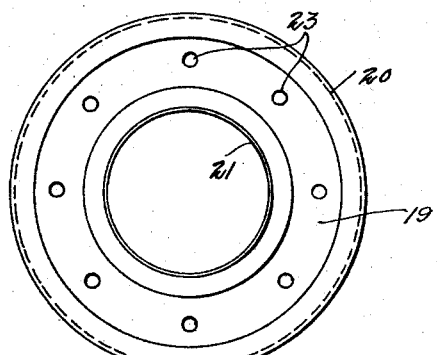
Fig. 2 is a top plan view of the attachment.

As illustrated, my improved and novel device for preventing the boiling over of milk or the like is composed of a foot part or flange 19 having a plurality of comparatively wide openings 23 formed therein and having substantially the form of a dish with an upright flange. Integrally made with the foot flange 19 is a substantially conically shaped body 21, having a plurality of openings 22 formed in its mantle arranged in one or more rows conveniently spaced.

The lower part of flange 19 is formed with a groove 24 into which snugly fits the upper bead 20 of a cooking vessel 25 with which the attachment is to be used and which is equipped with a suitable handle 26.

It will be clear that any suitable vessel may be used with which the attachment is used in the manner indicated in Figure 1.

If the milk or the like starts to boil and consequently to rise in vessel 25 its cap of foam and the thin skin forming on the top level of the milk will engage the lower inner face of flange 19 so as to break the skin and will then rise into the conical body 21 and flow through the openings 22 downward along the outer mantle of body 21 and into the dish-like flange 19, the upper part of which is curved as shown to form a cavity from which the milk will then be returned through the openings 23 into the cooker, so that a boiling over of the milk or the like is prevented and the well known obnoxious odor developing if the milk boiling over the pot comes in contact with the hot stove is avoided.

It will be understood that I have shown and described the preferred form of my device only as one example of the many possible ways to practically construct the same, and that I may make such changes in the construction of my device as come within the scope of the appended claims without departure from my invention and the principles involved.

Having thus described my invention, what I claim as new and desire to secure by Letters Patent is:

1. An attachment for milk boilers for preventing overflowing of the milk comprising a dish-like perforated foot flange having a central opening and an upstanding central substantially cone-shaped body having a plurality of perforations in its mantle integral with said foot flange, the perforations in said body effecting a return of the rising milk into the dish-like foot flange and through the perforations therein into the milk boiler, the inner face of said foot flange adapted to break the skin formed on the upper level of the milk within the boiler, and means formed with said foot flange to securely hold said attachment on a cooking vessel.

2. An attachment for cooking vessels having an upper bead, comprising a perforated foot flange provided with an inner groove on its lower face adapted to engage the bead of said cooking vessel to provide a firm seat for the attachment, the upper face of said foot flange dish-shaped and a substantially conically-shaped, body integrally formed with said foot flange and having a plurality of perforations in its mantle, said perforations in its mantle adapted to impart to the milk rising in the cooking vessel a deviation from its flow and diverting the same into said dish-shaped part of the foot-flange to flow back into the cooking vessel through the perforations of said flange.

Signed at New York, in the county of New York, and State of New York, this 4th day of October, A. D. 1929.

MARTIN BLENZ.